United States Patent [19]
Ganguly et al.

[11] Patent Number: 5,721,896
[45] Date of Patent: Feb. 24, 1998

[54] METHOD FOR SKEW RESISTANT JOIN SIZE ESTIMATION

[75] Inventors: Sumit Ganguly, Bhopal, India; Phillip B. Gibbons, Westfield, N.J.; Yossi Matias, Potomac, Md.; Abraham Silberschatz, Summit, N.J.

[73] Assignee: Lucent Technologies Inc., Murray Hill, N.J.

[21] Appl. No.: 644,599

[22] Filed: May 13, 1996

[51] Int. Cl.⁶ .................................................. G06F 17/30
[52] U.S. Cl. .......................................... 395/602; 395/605
[58] Field of Search ...................................... 395/601, 602, 395/603, 604, 605, 606, 611, 616

[56] References Cited

U.S. PATENT DOCUMENTS

| | | | |
|---|---|---|---|
| 5,161,223 | 11/1992 | Abraham | 395/603 |
| 5,301,317 | 4/1994 | Lohman et al. | 395/602 |
| 5,355,473 | 10/1994 | Au | 395/603 |
| 5,488,725 | 1/1996 | Turtle et al. | 395/605 |
| 5,598,559 | 1/1997 | Chaudhuri | 395/602 |
| 5,619,688 | 4/1997 | Bosworth et al. | 395/604 |

OTHER PUBLICATIONS

"Combinatorial Optimization of Distributed Queries", Bojan Grošelj & Qutaibah M. Malluhi, Dec. 1995.
"Towards the Reverse Engineering of Denormalized Relational Databases" J-M. Petit, F. Toumani, J-F. Boulicaut, J. Kouloumdjian, 1996 month n/a.
"Implementation of Relational Database Operations in Optics" Pericles A. Mitkas, P. Bruce Berra, 1992 month n/a.
"Microdata Disclosure Limitation in Statistical Databases Query Size and Random Sample Query Control" George T. Duncan, Sumitra Mukherjee, 1991 month n/a.

Primary Examiner—Thomas G. Black
Assistant Examiner—Ruay Lian Ho
Attorney, Agent, or Firm—Vernon E. Williams

[57] ABSTRACT

A method of estimating the query size of two databases T and R is disclosed. The method uses a threshold value to categorize the databases as dense or sparse. A dense-dense procedure is then applied to the two databases to produce a dense-dense estimate ($A_d$). A sparse-any procedure that suppresses the dense data items coming from database T is performed which produces a first sparse-any estimate ($A_{s1}$). A second sparse-any estimate ($A_{s2}$) is then produced by suppressing the dense data items from database R. Ultimately a query size estimate is produced by combining the dense-dense estimate, the first sparse-any estimate and the second sparse-any estimate.

13 Claims, 1 Drawing Sheet

METHOD FOR SKEW RESISTANT JOIN SIZE ESTIMATION

TECHNICAL FIELD

This invention relates to database query estimation.

BACKGROUND OF THE INVENTION

As the proliferation of computers increases, computer databases have increased as well. The size of modern day computer databases is often very large with some databases holding hundreds to billions of data items. In a query of one of these databases every single data item is a possible match with the query and often every data item must be compared. Therefore as the size of these databases increases the cost of performing queries can increase as well.

A database consists of one or more tables, each table holding hundreds to billions of data records. Each data record contains one or more fields that contain information. Based on the information in these fields a record can be categorized as one of several types. For example, a table may contain records of men, where each record has a field giving the man's name and a field giving his favorite sport. Each record can then be categorized by the favorite sport, so each record may be of type "baseball", "football", or "hockey".

It is desirable to be able to quickly answer queries of tables of databases. One common query is an equi-join query. The result of an equi-join query of two tables R and T is the table consisting of all pairs of records, one record from R and one record from T, with the same type. For example, if table R contains records of men and their favorite sport, and table T contains records of women and their favorite sport, then the equi-join of table R and T is the table containing all pairs of records of men and women with the same favorite sport.

Computing the result of an equi-join may potentially be too costly. For example, if one table has n records and a second table has n records, computing the result may require a comparison of $n^2$ pairs of records. Performing each of the $n^2$ comparisons increases the cost of the query. Therefore it would be advantageous to lower the cost of equi-join queries.

As a result of the need to reduce the cost of performing expensive queries on large databases, the field of database estimation has become popular. In database estimation an estimate is made of the potential output of a query (called the estimate of the query) on a database. Therefore an estimate of the query is calculated before making the query. As a result, decisions can be made as to whether to proceed with the query and incur the cost, or to cancel this particular query. The problem of database estimation involves computing an estimate for a particular query such that the estimate is accurate and the computation is efficient.

Previous attempts have been made to solve the problem of database estimation. Some techniques, called parametric techniques take the data and try to compare the data in a database to a known data model. The rationale being, that the behavior and characteristics of the data model, will be the same as the data in the database. However, with parametric techniques assumptions have to be made about how close the data is to the known data model, and the closeness (fit of the data) can widely vary the accuracy of the results. Another class of techniques take a sample (subset) of the data items in the database and perform estimates based on the samples. This class of techniques are known as sampling techniques. The samples are usually taken of the individual databases and then combined to produce a query estimate. Sampling techniques have proven to be advantageous over other database estimation techniques. Unlike parametric methods, sampling techniques require that fewer assumptions be made about the fit of the data. In addition, sampling techniques always have an assurance of accuracy called a statistical confidence. The statistical confidence for most sampling techniques is typically aimed at being in the range of 90% to 99%.

Neither sampling or parametric techniques are good for database estimation. However, sampling techniques may provide more accurate results than parametric techniques when the data items in the database are skewed. For example, if the databases discussed above are non-uniform (a non-uniform database is a database in which there is an unequal mixture of different types of data items in the database) the parametric techniques may not exhibit good performance. When there are significantly more (e.g., 20% or greater) data items of one type than of the other types, the database is said to be skewed. Skewed databases have been found to be problematic when performing parametric techniques or sampling techniques.

Depending on whether the sample contains many skewed data items or whether the sample contains very few skewed data items, the effect of the skewed data can drastically effect the outcome of the sampling techniques. When using sampling techniques, gross samples are taken of tables T and tables R that may not account for the effect of skewed data. Therefore, it would be advantageous to implement a sampling technique, which takes skewed data into account.

SUMMARY OF THE INVENTION

The present invention implements a method of estimating data base queries that is sensitive to the potential skew of the data. The total estimate of the database query is performed by combining three individual estimates. First an estimate is performed of the data items with a particular join attribute value that densely populate both databases R and T. Secondly, an estimate is made which suppresses the effect of the dense data items with a particular join attribute value, in a first database R, and lastly an estimate is made which suppresses the effect of the dense data items with the same join attribute value in a second database T.

The present invention takes a comprehensive approach to the estimation of database queries. The comprehensive approach is created by establishing a relationship between the data items in two different databases R and T. The relationship is known as a bi-partite graph consisting of a collection of sub-joins. Each sub-join is associated with a particular join attribute value. The sub-join consist of all pairs of data items from R and T having this particular join attribute value.

A random sample of each database is collected (e.g., R* and T* denote the random samples of databases R and T respectively). The sub-joins in the random samples R* and T* are then estimated to have a dense population of data items of a particular join attribute value, or a sparse population of data items of a particular join attribute value, based on whether the number of data items of a particular join attribute value, are above or below a threshold value. In the methodology of the present invention it should be appreciated that a data item is dense if its join attribute value is dense and sparse if the populations of data items with the join attribute value is sparse. The threshold value is defined as being the square root of the number of data items in the database. When both data items of each pair of a sub-join are dense then the sub-join is referred to as dense-dense. When in each pair of a sub-join one data item is categorized as being sparse and the other data item is categorized as dense or sparse the sub-join is referred to as sparse-any (e.g., dense-sparse, sparse-dense or sparse-sparse).

A series of three estimates is then performed on the databases. A procedure is first applied to the random samples to determine a dense-dense estimate ($A_d$). A sparse-any ($A_{s1}$) estimate is then performed which suppresses the dense data items with a join attribute value in R, and a sparse-any ($A_{s2}$) estimate is performed that suppresses the dense data items with a join attribute value in T. Lastly, a database query estimate (A) is produced by combining the dense-dense estimate, the sparse-any estimate which suppresses the dense data items in R, and the sparse any estimate which suppresses the dense data items in T.

The dense-dense estimate and sparse-any estimates are performed by estimating the data items with a join attribute value in one random sample (e.g. R*) that could potentially match to the second random sample (e.g., T*), for a particular database query. As mentioned above, the matches of data items with a particular join attribute value is called a sub-join in the present methodology. Therefore for each join attribute value the size of the sub-joins associated with the value is estimated. The sum of the estimates of the sub-joins, are then summed for all the join attribute values, and those sums (e.g., dense-dense estimate, sparse-any estimate), combine to produce the database query estimate.

BRIEF DESCRIPTION OF THE DRAWINGS

The objects, advantages and novel features of the invention will be more fully apparent from the following detailed description when read in connection with the accompanying drawings wherein.

DETAILED DESCRIPTION OF THE INVENTION

Figure 1A:
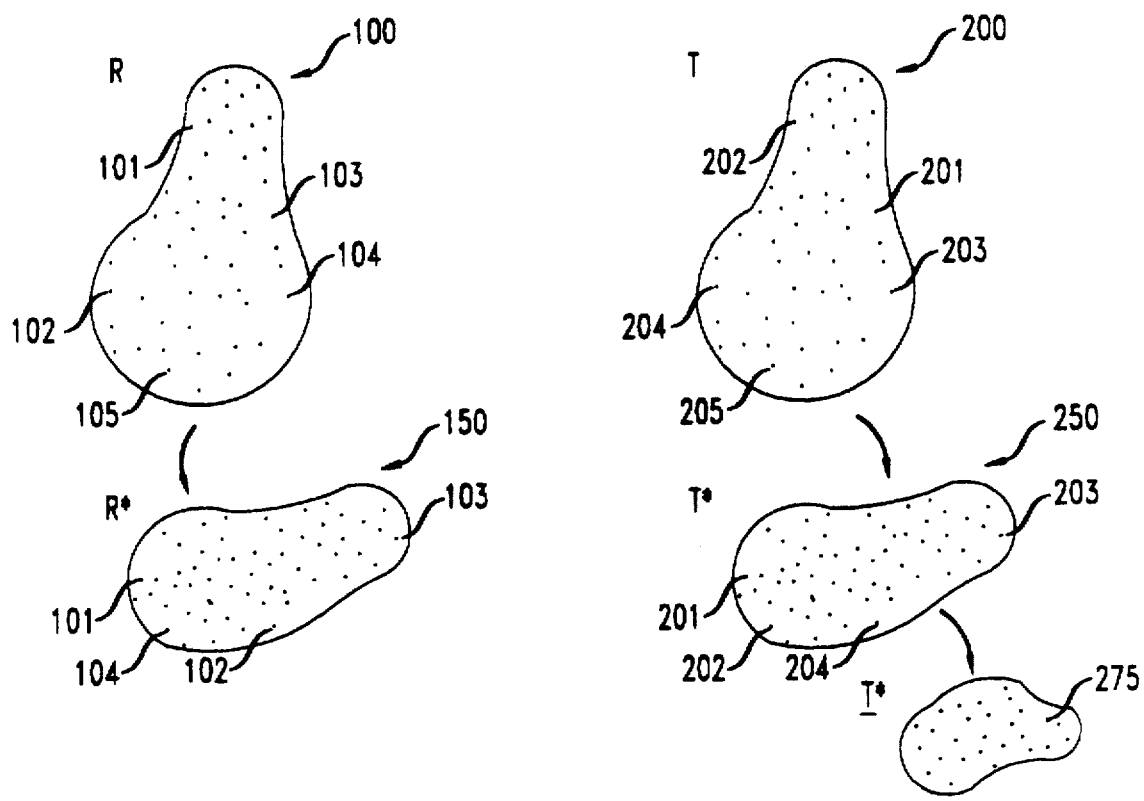
FIG. 1A displays a conceptual drawing of populations R and T and random samples R* and T*.

In the present invention a method for estimating equi-join database query sizes is performed. A query criterion is defined. Data items from each database, are grouped according to the query criterion. Estimation procedures known as the "dense-dense" procedure and the "sparse-any" procedure are then applied to each of the defined groups, to determine an overall estimate of the database query.

Specifically the present methodology performs an equi-join estimation (A) of databases R and T by performing a dense-dense estimate ($A_d$) of the two databases. A sparse-any procedure which suppresses the dense data items in R is then performed to produce a first sparse-any estimate ($A_{s1}$). A sparse-any procedure which suppresses the dense data items in T is then performed, to produce a second sparse-any estimate ($A_{s2}$). Lastly the equi-join estimation (A) of the two databases is computed, by combining (summing) $A_d$, $A_{s1}$ and $A_{s2}$.

As a means of illustrating the methodology of the present invention, FIG. 1 displays a conceptual model that can be used to facilitate discussion. In FIG. 1 a first database (R) denoted by 100 and a second database (T) denoted by 200 are displayed. Both the first database R and the second database T have a number of data items with different join attribute values (e.g., 101, 102, 103, and 201, 202, 203, respectively). In addition, samples of the two databases are displayed. A first random sample (R*) is denoted by 150 and a second random sample (T*) is denoted by 250. Both of the random samples 150 and 250, will include a random sampling of data items from the original databases R and T. Therefore the first random sample (R*) denoted by 150 may include data items 101, 102, and 103, and the second random sample (T*) denoted by 250 may include data items 201, 202, and 203.

To develop intuitive understanding of the conceptual model presented in FIG. 1, assume that the data items in database R represent a population of men that have a favorite sport (the favorite sport would be the join attribute value). Therefore data items 101, 102, and 103 each represents a specific man that likes a particular sport. Secondly, assume that database T represents a population of women that have a favorite sport. Therefore each data item 201, 202, and 203 represents a specific woman that likes a particular sport. Furthermore, for simplicity assume that the favorite sport (join attribute value) that each of the men or women likes is either baseball, football, or hockey. Therefore database R represents a population of men whose favorite sport is baseball, football, or hockey, and database T is a population of women whose favorite sport is baseball, football, or hockey. A potential query (equi-join) of databases R and T could match, (1) men and women that like baseball, (2) men and women that like football and (3) men and women that like hockey. A query of this type may be accomplished in three steps if it is done without estimation techniques. First database R would be searched for all men whose favorite sport is baseball. Secondly, database T would be searched for all women whose favorite sport is baseball. Lastly, a match of men and women whose favorite sport is baseball (football and hockey) is made. If database R and database T both contain n data items then, matching men and women with the same favorite sport could result in $n^2$ operations.

Figure 1B:
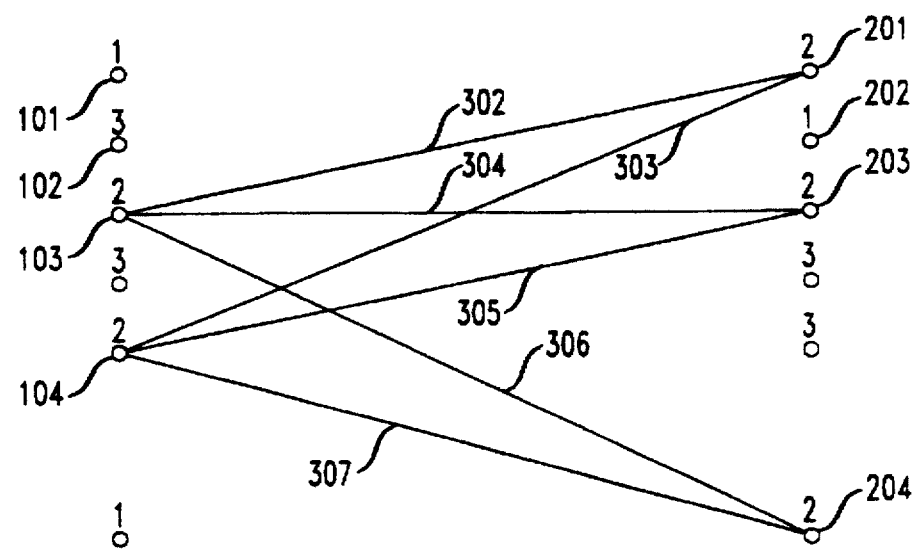
FIG. 1B displays a bi-partite graph of selected data items of the random samples R* and T*, and the sub-join for join attribute value 2.

In the methodology of the present invention, random samples R* and T* are taken from databases (R) and (T), respectively. The samples are then categorized by join attribute value. To categorize the data items by a join attribute value assume that each of the favorite sports had a number associated with it (e.g., baseball "1", football "2", and hockey "3"). The match of a man and a woman that likes a particular sport could then be displayed with the bi-partite graph in FIG. 1B. In FIG. 1B, each data item from the random samples R* and T* of FIG. 1A, is displayed with the number of the favorite sport above it. For example, data item 101 is a man from random sample R* that likes baseball (since there is a numeral one above data item 101). Data item 201 of FIG. 1B, is a data item from random sample T*. Therefore data item 201 of FIG. 1B is a woman that likes football (since data item 201 of FIG. 1B has a 2 above it). The pairing of men and women that prefer a particular sport can then be displayed as a bi-partite graph such that there is a node in the graph representing each man and woman, and an edge (line drawn between data items) between a node representing a man, and a node representing a woman, if the man and woman prefer the same sport. In FIG. 1B, data items 101, 102, 103 represent records for three men (which like the sports represented by 1, 3, and 2 respectively), and data items 201, 202, 203 represent records for women (who like sports of type 2, 1, 2, respectively). The edges denoted by 302, 304, 306 pair the man denoted by 103 (a man who likes baseball), with three women (who like baseball).

In general, for each join attribute value (e.g., baseball, football, hockey), we have edges pairing each of the men with this join attribute value (e.g., 1, 2, 3) to women with the same join attribute value (e.g., 1, 2, 3). The set of data items and edges of one particular join attribute value is denoted as a sub-join. There is exactly one sub-join for each join attribute value (e.g., baseball denoted by 1, football denoted by 2, and hockey denoted by 3). For example the sub-join of men and woman that prefer baseball would consist of the data items 103, 104, the edges, 302, 303, 304, 305, 306, 307, and the data items 201, 203, and 204.

Utilizing the threshold values of the individual databases, the present invention defines relationships such as dense-dense, and sparse-any (i.e., dense-sparse, sparse-dense and sparse-sparse). It should be appreciated that the threshold value may be any value that enables the random sample to be a representation of the population of dense data types. The relationships are defined as follows:

dense-dense—a relationship where the number of data items with a join attribute value in database (R) and the number of data items with the same join attribute value in database (T) are each greater than or equal to sqrt(n), where n is the number of data items in the database.

dense-sparse—a relationship where the number of data items with a join attribute value in database (R) is greater than or equal to sqrt(n), and the number of data items in database (T) is less than sqrt(n), where n is the number of data items in each of the databases.

sparse-dense—a relationship where the number of data items with a particular join attribute value in database (R) is less than sqrt(n) and the number of data items in database (T) is greater than or equal to sqrt(n), where n is the number of data items in each of the databases.

sparse-sparse—a relationship where the number of data items with a particular join attribute value in database (R) and database (T) are less than sqrt(n), where n is the number of data items in each of the databases.

In the methodology of the present invention for a set of data items T with a join attribute value v, "$mult_T(v)$" is defined to be the number of data items in T with the join attribute value v. A join attribute value is defined to be dense in R if $mult_R(v)$ is greater than or equal to the square root of n, and defined to be sparse in R if $mult_R(v)$ is less than the square root of n. In addition, Sub-join(v) is a dense-dense Sub-join if v is dense in both R and T. Sub-join(v) is a sparse-dense Sub-join if v is sparse in R and dense in T. Sub-join(v) is a sparse-sparse Sub-join if v is sparse in both R and T.

In the methodology of the present invention, n is the number of data items in each relation, $m_1$ is the sample size for the dense-dense procedure, $m_2$ is the sample size for the sparse-any procedure and $\delta$ is a threshold value used in the dense-dense procedure. Given the variables defined above each of the estimates can be defined as follows:

$$A_d := f_d(n, m_1, \delta);$$

$$A_{s1} := f_s(R, T, n, m_2);$$

$$A_{s2} := f_s(T, R, n, m_2);$$

$$A := A_d + A_{s1} + A_{s2};$$

where $f_d(x)$ and $f_s(x)$, is a function of x, A is the total database estimate, $A_d$ is the dense-dense database estimate, $A_{s1}$ is the sparse-any database estimate which suppresses the dense data items in R, and $A_{s2}$ is the sparse-any estimate which suppresses the dense data items in T. If A<n log n then the method also provides a sanity bound (S):=n log n which is an upper bound for the query size. In the disclosed embodiment $m_1$=(sqrt(n)+log n)*log n, $m_2$=sqrt(n)+log n, and $\delta$=log n.

In the present invention a random sample of each database is taken. The random sample taken of the two databases R and T is at most $m_1+m_2$, where $m_1$ is the number of data items sampled from R and T (individually) when performing a dense-dense estimation, and $m_2$ is the number of data items sampled from R and T (individually) when performing a sparse-any estimate. Once the samples are taken a dense-dense estimate ($A_d$) is derived, a sparse-any estimate ($A_{s1}$) which suppresses dense data items in R is computed, and a sparse-any estimate ($A_{s2}$) which suppresses dense data items in T is computed. Lastly, an estimate of the query size can be performed by combining $A_d$, $A_{s1}$ and $A_{s2}$.

DENSE-DENSE

The first step of the present methodology, the dense-dense procedure, includes the following steps:

1. Random samples R* and T* are taken from databases R and T. The random samples R* and T* are each of size $m_1$.
2. Let V* be the set of join attribute values of data items in both R* and T*.
3. For each value v∈V*, determine $mult_{R*}(v)$.
4. For each value v∈V*, determine $mult_{T*}(v)$.
5. For each value v∈V*, if $mult_{R*}(v) \geq \delta$ and $mult_{T*}(v) \geq \delta$ then A':=A'+$mult_{R*}(v)$*$mult_{T*}(v)$, where A' is an intermediate dense-dense estimate (A' is initially set to zero) and "*" is the symbol used to denote multiplication.
6. The dense-dense estimate $A_d := (n/m_1)^2 * A'$.

SPARSE-ANY

The method of producing the sparse-any estimate consists of the following procedures:

1. Random sample T* is taken from database T. The random sample T* is of size $m_2$.
2. If determining $mult_R(v)$ requires a large number of computations for dense v then use probabilistic elimination to suppress dense v;
2a. Random sample R* is taken from database R. The random sample R* is of size $m_2$.
2b. For each join attribute value v appearing in R* remove from T* all data items with join attribute value v.
3. Compute an intermediate sparse-any estimate on the remaining join attribute value data items that are sparse in R:

For each data item y in T*,
3a. Determine the number, x, of data items in R that join with y i.e. that has the same join attribute value as y;
3b. If x<n/$m_2$ then A':=A'+x.A' is an intermediate sparse-any estimate (A' is initially set to zero).
4. $A_s$:=nA'/$m_2$, where $A_s$ is the sparse-any estimate.

In the methodology of the present invention, the sparse-any estimate is performed twice. The second time the sparse-any procedure is performed, the dense data items of the data base that was not used the first time, is suppressed. For example, if the dense data items of data base R were suppressed the first time the sparse-any procedure is performed, the second time the dense data items of data base T will be suppressed. The first time the sparse-any estimate is performed the estimate is denoted by $A_{s1}$, the second time the sparse-any estimate is performed (with the roles of R and T reversed) the estimate is denoted as $A_{s2}$. Once all of the estimates in dense-dense and sparse-any are computed, the equi-join estimate is denoted by $A=A_d+A_{s1}+A_{s2}$. If $A<(n)\log(n)$, an output of the sanity bound $S=(n)\log(n)$ can be computed, where S is the sanity bound; hat maintains the statistical confidence of the estimate. It should be appreciated that in addition to adding the dense-dense estimate, the first sparse-any estimate and the second sparse-any estimate to compute the equi-join estimate, the equi-join estimate may also be approximated by averaging the three estimates, or taking the maximum of the three estimates.

In addition the methodology of the present invention can be applied to any number of databases. For example, if three databases are involved, A, B, and C, the methodology presented can first be applied to databases A and B, producing an intermediate estimate which can then be combined, using the present methodology with C.

The present invention can also be applied to produce accurate and inexpensive estimation of database queries. The methods are useful in query optimizers, or in determining resource allocation necessary to balance workloads on multiple processors in parallel or distributed databases. In addition, on a broader scale, the methods disclosed can be applied to large database applications such as financial audits and statistical studies.

While several embodiments of the invention are disclosed and described, it should be appreciated that various modifications may be made without departing from the spirit of the invention or the scope of the subjoined claims.

The invention claimed is:

1. A method of managing data by estimating an equi-join of at least two databases R and T, said method comprising the steps of:

estimating a query size of dense data items in R and dense data items in T, thereby producing a dense-dense estimate, estimating a query size which suppresses dense data items in R, thereby producing a first sparse-any estimate, estimating a query size which suppresses dense data items in T, thereby producing a second sparse-any estimate, and combining said dense-dense estimate, said first sparse-any estimate and said second sparse-any estimate, thereby producing an estimate of a size of an equi-join of the database R and the database T.

2. A method as claimed in claim 1 wherein said step of combining is performed by adding said dense-dense estimate, said first sparse any estimate and said second sparse-any estimate.

3. A method as claimed in claim 1 wherein said step of combining is performed by averaging said dense-dense estimate, said first sparse any estimate and said second sparse-any estimate.

4. A method as claimed in claim 1 wherein said step of combining is performed by selecting one of said dense-dense estimate, said first sparse-any estimate and said second sparse-any estimate as a largest value.

5. A method of managing data by estimating a database query size of at least two databases R and T, said method comprising the steps of:

performing an estimate of dense data items in database R with an attribute value and dense data items of database T with the attribute value thereby producing a dense-dense estimate, performing an estimate which suppresses dense data items in said database R thereby producing a sparse-any estimate in R, performing an estimate which suppresses dense data items in T thereby producing a sparse-any estimate in T, combining said dense-dense estimate, said sparse-any estimate in T, and said sparse-any estimate in R, thereby estimating a database query size of said database R and said database T.

6. A method as claimed in claim 5 wherein said dense-dense estimate is performed by, sampling data items from said database R, thereby producing a sample $R^*$, sampling data items from said database T thereby producing a sample $T^*$, determining a number of data items in said sample $R^*$ with a join attribute value (v) thereby producing a multiplicity of said join attribute value (v) in R, determining a number of data items in said sample $T^*$ with said join attribute value (v), thereby producing a multiplicity of said join attribute value (v) in T, for each of said join attribute value (v) determine an intermediate dense-dense estimate of a size of a sub-join of said join attribute value (v), summing the intermediate dense-dense estimate for each of the join attribute values (v), and scaling the intermediate dense-dense estimate of said size of said sub-join attribute value (v), thereby performing a dense-dense estimate.

7. A method as claimed in claim 6 wherein the intermediate dense-dense estimate is obtained after establishing a threshold value and comparing the multiplicity of said join attribute value (v) in T and the multiplicity of the join attribute value (v) in R with the threshold value.

8. A method as claimed in claim 7 wherein said intermediate dense-dense estimate is obtained after determining that the multiplicity of said join attribute value (v) in $T^*$ and the multiplicity of the join attribute value (v) in $R^*$ are both above the threshold.

9. A method as claimed in claim 7 wherein said intermediate dense-dense estimate is obtained after determining that the multiplicity of said join attribute value (v) in $T^*$ and the multiplicity of the join attribute value (v) in $R^*$ are both equal to said threshold.

10. A method as claimed in claim 5 wherein said first sparse-any estimate is performed by, sampling data items from said database T, thereby producing a sample $T^*$, suppressing data items in $T^*$ whose multiplicity in R is above a threshold, for each of the join attribute values (v), compute an intermediate sparse-any estimate on data items with the join attribute value (v) that are sparse in T, summing the intermediate sparse-any estimate for each of the join attribute values (v), and scaling said intermediate sparse-any estimate thereby producing the sparse-any estimate of T in R.

11. A method as claimed in claim 10 wherein said step of suppressing data items in $T^*$ is performed by determining a multiplicity of data items in R with a dense join attribute value (v).

12. A method as claimed in claim 10 wherein said step of suppressing data items in $T^*$ is performed by taking a random sample $R^*$ from R and for each join attribute value (v) appearing in $R^*$ removing all data items with join attribute value (v) form $T^*$.

13. A method as claimed in claim 5 wherein said second sparse-any estimate is performed by, sampling data items from said database R, thereby producing a sample R*, determining a cost of computing a multiplicity of data items in R with a dense join attribute value (v), for each data items in R* determine the multiplicity of data items in T with the join attribute value (v), for each of the join attribute values (v), compute an intermediate sparse-any estimate on data items with the join attribute value (v) that are sparse in R, summing the intermediate sparse-any estimate for each of the join attribute values (v), and scaling said intermediate sparse-any estimate thereby producing the sparse-any estimate of R in T.

* * * * *